(12) United States Patent
Shim (10) Patent No.: US 9,044,881 B2
(45) Date of Patent: Jun. 2, 2015

(54) MANUFACTURING NANOCOMPOSITES

(75) Inventor: Youngtack Shim, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 1406 days.

(21) Appl. No.: 12/197,994

(22) Filed: Aug. 25, 2008

(65) Prior Publication Data

US 2010/0047570 A1    Feb. 25, 2010

(51) Int. Cl.
  *B29C 47/00* (2006.01)
  *B29C 47/10* (2006.01)
  *B29C 47/06* (2006.01)
  *B29K 105/06* (2006.01)
  *B29K 105/16* (2006.01)

(52) U.S. Cl.
  CPC ......... *B29C 47/1045* (2013.01); *B29C 47/0019* (2013.01); *B29C 47/0023* (2013.01); *B29C 47/0026* (2013.01); *B29C 47/064* (2013.01); *B29K 2105/06* (2013.01); *B29K 2105/162* (2013.01); *B29C 47/1009* (2013.01)

(58) Field of Classification Search
  USPC .......... 428/364, 394; 264/1.29, 433, 141, 264/148–151, 3.3, 13, 452, 464, 37.26, 264/37.32, 45.9, 623, 634, 638, 75, 514, 264/539, 540, 171.11, 171.2, 171.21, 264/173.12, 173.16, 176.1, 177.17, 209.7, 264/210.6, 211.1, 211.21, 209.8, 211.23, 264/920, 108, 171.26, 171.27, 171.29, 264/172.1, 173.18, 177.16, 177.2, 209.2, 264/211, 310; 425/97, 114; 977/700, 701, 977/707, 712, 737, 742, 773, 775, 779, 787, 977/840, 855, 857, 858, 890
  See application file for complete search history.

(56) References Cited

U.S. PATENT DOCUMENTS

| | | | |
|---|---|---|---|
| 2,962,786 A | 12/1960 | Hawk, Sr. et al. | |
| 3,476,627 A | 11/1969 | Squires | |
| 3,664,790 A | 5/1972 | Hollander | |
| 5,164,123 A | 11/1992 | Goudy, Jr. | |
| 5,258,160 A | 11/1993 | Utsumi et al. | |
| 5,335,712 A | 8/1994 | Corbett et al. | |
| 2002/0185770 A1 | 12/2002 | McKague | |
| 2005/0256242 A1* | 11/2005 | Ottaviani et al. | 524/445 |
| 2005/0260408 A1* | 11/2005 | Anand et al. | 428/364 |
| 2006/0103045 A1 | 5/2006 | O'Brien-Bernini et al. | |
| 2007/0141316 A1 | 6/2007 | McGrath et al. | |
| 2007/0225409 A1 | 9/2007 | Matsumoto | |
| 2008/0086096 A1 | 4/2008 | Voznyakovski et al. | |
| 2008/0152896 A1* | 6/2008 | Moorlag et al. | 428/323 |
| 2009/0226711 A1* | 9/2009 | Silvi et al. | 428/331 |

* cited by examiner

*Primary Examiner* — Stella Yi
(74) *Attorney, Agent, or Firm* — Knobbe Martens Olson & Bear, LLP (57) ABSTRACT

Techniques for preparing polymer nanocomposites (PNCs) are provided. In one embodiment, a polymer extruding device includes a barrel configured to accommodate a raw material, a shaft disposed in the barrel, a motor coupled to the shaft and configured to rotate the shaft to move the raw material, and a die coupled to the barrel and including one or more first injector configured to inject nanoparticles into the die, thereby forming a layer of the nanoparticles on a surface of the raw material. The polymer extruder may further include a rotor disposed at one end of the die and configured to receive the raw material from the die.

36 Claims, 7 Drawing Sheets

MANUFACTURING NANOCOMPOSITES

TECHNICAL FIELD

The present disclosure relates generally to nanocomposites and, more particularly, to polymer nanocomposites.

BACKGROUND

Recent advances in nanotechnology have allowed the development of various new, useful materials with enhanced mechanical and/or chemical properties by integrating nanoparticles with larger, matrix structures (e.g., polymer matrix). One such example includes nanocomposites.

Nanocomposites are materials that are formed by incorporating nanoparticles into a macroscopic material on a scale of millimeters or micrometers, and the resulting nanocomposite material may exhibit drastically enhanced properties. For example, adding carbon nanotubes can dramatically increase thermal and electrical conductivity, while adding different species of nanoparticles may result in enhanced dielectric properties, optical properties, or greater mechanical properties such as stiffness and strength.

In particular, polymer nanocomposites ("PNCs") are rapidly emerging one of the most promising materials that can enhance a multitude of commercial products. PNCs are a class of reinforced polymers with nanoparticles which give them improved barrier properties, fire resistance, mechanical strength, etc. Such properties have made them valuable in components such as panels and as barrier and coating materials in automobile, civil and electrical engineering as well as packaging. Despite their desirable properties, however, PNCs are costly and complex to produce on a commercial-scale.

SUMMARY

Techniques for preparing PNCs are provided. In one embodiment by way of non-limiting example, an apparatus comprises a barrel configured to accommodate a raw material; a shaft rotatably disposed in the barrel; a motor coupled to the shaft and configured to rotate the shaft to force the raw material through the barrel; a die coupled to the barrel and including one or more first injectors configured to inject nanoparticles into the die, thereby forming a nano composite where a layer of the nanoparticles is disposed over a surface of the raw material; and a rotor disposed at one end of the die and configured to receive the raw material from the die.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

Figure 1:
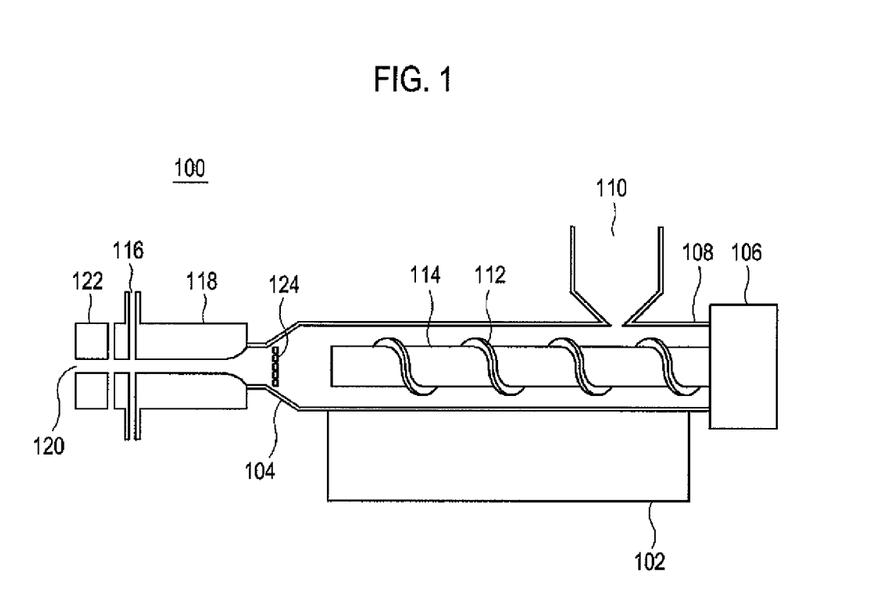
FIG. 1 shows a schematic view of a polymer extruder for extruding a nano composite in which nanoparticles are helically-aligned on an external surface of an extrudable raw material in one embodiment.

Referring to FIG. 1, one illustrative embodiment of a polymer extruder 100 is illustrated for extruding a nano composite in which nanoparticles are helically-aligned on an external surface of an extrudable raw material. Polymer extruder 100 includes a base 102, a feed pipe 104, a motor 106, a barrel 108, a hopper 110, a screw blade 112, a shaft 114, a first injector 116, a die 118, an opening 120, a rotor 122 and a screen pack 124. In certain embodiments, polymer extruder 100 includes hopper 110 mounted on one end of barrel 108 to feed extrudable raw materials into barrel 108. Base 102 may be integrated with motor 106, forming a protective housing or enclosure for motor 106 and shaft 114, and constructed of sheet metal or aluminum alloys, or any other suitable material. Polymer extruder 100 includes feed pipe 104 on another end of barrel 108 to physically couple barrel 108 to die 118, and to form a passageway through which the raw materials from barrel 108 can be discharged into die 118. Die 118 may include one or more first injectors 116.

Polymer extruder 100 may receive the raw materials (e.g., thermoplastic and thermosetting polymers which may optionally include therein composites, carbon composites, graphite/epoxy composites, steel reinforced composites or any combination thereof) through hopper 110. In some embodiments, hopper 110 may be integrally molded with barrel 108, and have a generally circular or rectangular cross-section. As shaft 114 is rotated by motor 106, polymer extruder 100 may force the raw materials toward die 118 to be extruded through opening 120, thereby manufacturing an article made from the raw materials.

Shaft 114 is rotatably disposed in barrel 108. Screw blade 112 is securely attached helically around shaft 114. As will be appreciated by those skilled in the art, other screw blade designs and shapes may be adopted in polymer extruder 100 to force the raw materials towards die 118 when shaft 114 is rotated by motor 106. For example, there may be more than one screw blade 112 helically attached around shaft 114. Motor 106 is operatively coupled to shaft 114 to rotate shaft 114 in a predetermined direction at a certain rotation rate. For example, motor 106 may include an AC or DC electric motor.

As depicted in FIG. 1, hopper 110 is disposed at one end of barrel 108, near motor 106 (hereinafter a "proximal zone" of barrel 108). Hopper 110 receives and holds the raw materials in the form of small beads or pellets, thereby allowing the raw materials to be fed from hopper 110 into barrel 108. In some embodiments, the raw materials may be thermoplastic polymers including, without limitation, polypropylene homopolymers, polypropylene copolymers, blends thereof, and the like. For example, the homopolymer includes atactic polypropylene, isotactic polypropylene, syndiotactic polypropylene, blends thereof, and the like. The copolymer can be a random copolymer, a statistical copolymer, a block copolymer, blends thereof, and the like. In some embodiments, additives such as colorants and UV inhibitors (e.g., in either liquid or pellet form) may be added to be mixed into the raw materials. It is appreciated that other prior art polymers or other extrudable materials and mixtures may also be used as the raw materials as long as nano particles can be coated thereon inside the die 118.

Motor 106 rotates shaft 114 at a predetermined rotation speed to force the raw materials towards die 118 (hereinafter, a "distal zone" of barrel 108). For example, motor 106 may apply a predetermined torque to rotate shaft 114 according to various factors such as a viscosity of the raw materials, e.g., at up to 100 to 200 rpm. In this way, the raw material inside barrel 108 may advance from the proximal zone to the distal zone toward die 118, which is coupled to barrel 108 via feed pipe 104.

Polymer extruder 100 may include a heater (not shown) to heat barrel 108 to an elevated temperature, thereby transferring heat for melting the raw materials inside barrel 108. For example, the heater may heat barrel 108 up to the melting (or softening) temperature of the raw materials in barrel 108, e.g., to a predetermined temperature of about 200° C. or higher. In some embodiments, polymer extruder 100 may include one or more heating elements along the length of barrel 108 to provide a heating profile along barrel 108. For example, polymer extruder 100 may multiple independently-controlled heating elements to gradually increase the temperature of barrel 108 from the proximal zone to the distal zone of the barrel 108, thereby allowing the raw materials to melt gradually as they proceed through barrel 108. In this way, it is possible to lower the risk of overheating which may cause degradation in the raw materials.

In some embodiments, polymer extruder 100 may include screen pack 124 through which the molten raw materials pass to remove any solid contaminants in the molten (or softened) raw materials. Screen pack 124 may be disposed at the opening of barrel 108, e.g., between barrel 108 and feed pipe 104. In this case, barrel 108 and the screen pack may be reinforced to prevent leakage of the raw materials from barrel 108. For example, barrel 108 and the screen pack may be sealed with adhesives or other sealants. In this way, the screen pack may serve to provide back pressure in barrel 108, to facilitate uniform melting and proper mixing of the raw materials.

Upon exiting from barrel 108, the molten raw materials pass through feed pipe 104 to enter die 118. In some embodiments, die 118 of polymer extruder 100 includes one or more first injectors 116 which are disposed near feed pipe 104 and provide injection paths for nanoparticles. Die 118 is coupled to rotor 122 which is disposed at a distal portion of die 118 (i.e., away from motor 106), and arranged to receive therein the extruded raw materials from die 118.

Figure 2:
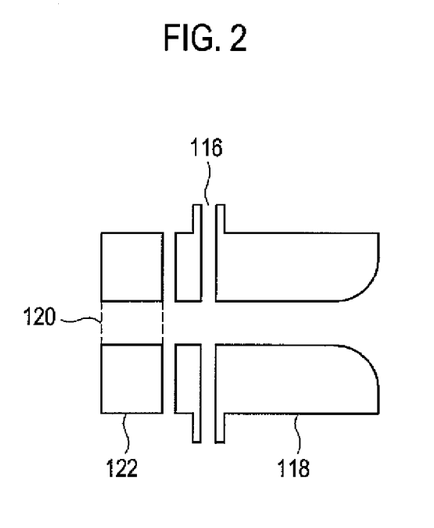
FIG. 2 is a schematic diagram of a die and a rotor of the polymer extruder where a first injector is incorporated in the die in one embodiment.

Referring to FIG. 2, one illustrative embodiment of die 118 and rotor 122 of polymer extruder 100 where first injector 116 is incorporated into die 118 is illustrated. As depicted, die 118 may include one or more first injectors 116, and is coupled to the rotor 122 having opening 120. First injectors 116 may be disposed to be generally flush with an internal lumen of die 118 to receive nanoparticles, thereby forming a layer of the nanoparticles on the surface of the molten raw materials as they are extruded through opening 120. First injectors 116 may inject nanoparticles into the stream of the molten raw materials in die 118, thereby forming a layer of the nanoparticles on the surface of the molten raw materials. In the illustrated embodiment, the tips of first injectors 116 may not protrude into the stream of the molten raw materials in the die 118 so that all or at least a substantial portion of the nanoparticles are coated on the exterior of the molten raw materials. Alternatively, the first injectors 116 may dispose their tips in the die lumen so that a non-negligible portion of the nanoparticles are disposed inside the molten raw materials. In this way, the position of the tips of the first injectors 116 may determine the distribution of the nanoparticles in the molten raw material. Rotor 122 is configured to rotate while abutting or contacting the surface of the raw materials on which the nanoparticles are coated or deposited. A separate driver (e.g., motor) may be used to rotate rotor 122. When the molten raw material passes through die 118, nanoparticles are coated on the molten raw materials through first injector 116.

In some embodiments, die 118 has a lumen with a generally uniform radius along the longitudinal axis thereof. Alternatively, die 118 may a lumen of which radius decreases from a proximal zone of die 118 (closer to barrel 108) to a distal zone of die 118 (closer to rotor 122), thereby forming a contracting path along the longitudinal axis of die 118. In this way, as the molten raw materials are pushed along the lumen of die 118, the nanoparticles become realigned in the direction of flow of the molten raw materials. As will be disclosed below, the exact pattern of the alignment of such nanoparticles depends not only on the movement of the molten raw materials but also on the movement of rotor 122.

Figure 3:
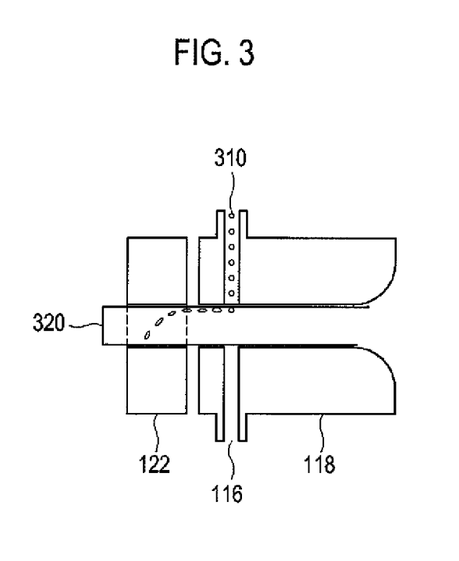
FIG. 3 is a schematic diagram of tracks of elongated nanoparticles inside the die in response to a rotation of the rotor in one embodiment.

Referring to FIG. 3, illustrated is one illustrative example of tracks of elongated nanoparticles 310 inside die 118 in response to a rotation of rotor 122. When the raw materials 320 pass through die 118, nanoparticles 310 are fed onto the surface of molten raw materials 320 through first injectors 116. In some embodiments, first injectors 116 may be configured to be generally flush with the lumen of die 118 to ensure nanoparticles 310 supplied through first injector 116 to flow near the wall of die 118, thereby allowing nanoparticles 310 to become distributed proximate to an inner wall of die 118. When a molten nano composite 320 exits from die 118, rotor 122 receives molten nano composite 320 while generating a rotating movement around molten nano composite 320 and physically contacting the surface of molten nano composite 320. In this way, rotor 122 may exert a frictional force onto nanoparticles 310 to physically align them along trajectories (or tracks) of rotor 122 itself. As molten raw materials 320 are pushed toward opening 120 while being abutted on revolving rotor 122, the alignment of nanoparticles 310 is determined by a linear movement of the molten raw materials and an angular movement of rotor 122 so that nanoparticles 310 may be aligned in a spiral or helical pattern around the surface of molten raw materials 320, as illustrated in FIG. 3. That is, such configuration of first injector 116 and rotor 122 may exploit so-called "friction-mediated alignment" of nanoparticles 310 on the surface of molten raw materials 320 while minimizing loss of nanoparticles 310 entrapped in an interior of molten raw materials 320.

First injectors 116 may be disposed at a certain position in die 118 or rotor 122 to provide injection paths for nanoparticles 310 to be fed from first injector 116 according to various factors such as, e.g., viscosity of molten raw materials 320, linear or volumetric flow rate of molten raw materials 320, temperature profile inside die 118, pressure distribution in die 118, desired amount of nanoparticles 310 to be coated on molten raw materials 320, fluid dynamic and kinematic properties of the nanoparticles, properties of a solution in which the nanoparticles are suspended, and the like. For example, first injectors 116 may be disposed at a distal zone of die 118. It should be appreciated that these factors for determining the location of first injectors 116 may be selected from one or more properties that are generally well known to one of ordinary skill in the relevant art such as polymer chemistry and processing, rheology, and the like. For example, it is appreciated that first injectors 116 may be disposed proximal to rotor 122 so that rotor 122 may touch and push nanoparticles 310 more in an angular direction than in a linear direction.

In some embodiments, polymer extruder 100 may include a cooling device to cool off the nano-composite (i.e., molten raw materials 320 coated with nanoparticles 310) as molten nano-composite is extruded from opening 120 of rotor 122. When nano-composite is extruded from die 118 through opening 120, molten nano-composite may be cooled, e.g., by pulling extruder 100 through a water bath or leaving polymer extruder 100 in room temperature for a predetermined period of time.

Figure 4:
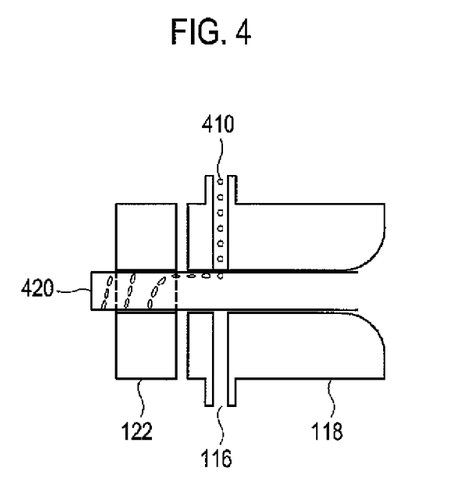
FIG. 4 shows a schematic view of tracks of elongated nanoparticles inside the die when the rotor rotates at a higher speed than in FIG. 3 in another embodiment.

Referring to FIG. 4, one illustrative embodiment of tracks of elongated nanoparticles inside die 118 when the rotor 122 rotates at a high speed is illustrated. Nanoparticles 410 are supplied through first injector 116 and are coated or deposited onto raw materials 420 that pass through the lumen of die 118 to form the nano-composite. The nano-composite exits from die 118 to enter rotor 122 that generates a rotating movement thereoaround, thereby forming a spiral or helical pattern of nanoparticles 410 and extruding the nano-composite through opening 120 to manufacture a nano-composite which in essence is a composite polymeric article. The spiral or helical pattern of nanoparticles 410 may be determined by, e.g., a revolving speed of rotor 122 and extrusion speed (e.g., linear speed) of molten raw material 420 along die 118 and rotor 122. In this way, nanoparticles 410 may define various helical or spiral tracks according to the ratio between the revolving speed of rotor 122 and the extruding speed of raw material 420. For example, the tracks of nanoparticles 410 may have the form of helical line inclined to have an acute angle with the longitudinal axis of die 118. The tracks of nanoparticles 410 may be vertical to the longitudinal axis of die 118 when rotor 122 speed is higher than a certain threshold (e.g., when the rotor revolving speed exceeds the linear speed), or the tracks may be horizontal to the longitudinal axis of die 118, e.g., when the linear speed of molten raw materials 420 is greater than the rotor revolving speed.

In some embodiments, die 118 may include a second injector (not shown) to supply an additional substance, e.g., a coupling substance or binder. The additional substance may be fed into die 118 through the second injector to facilitate the coupling of molten raw materials 420 with nanoparticles 410. The second injector may be disposed at a position in die 118 that may allow the coupling substance to coat the surface of molten raw materials 420. For example, one or more second injectors may be disposed between feed pipe 104 and first injectors 116 so that the coupling substance may be deposited between the raw materials and the nanoparticles. The coupling substance may include various substances to bind the molten raw materials and nanoparticles. The coupling substance may be selected according to detailed chemical or physicochemical features of the nanoparticles and molten raw materials, which are generally well known to those skilled in the relevant art, including but not limited to, 1-methoxy-2-amino-4-(β-hydroxyethyl amino) benzene, 2-amino-3-hydroxypyridine, 3-amino-2-methylamino-6-methoxypyridine, resorcinol, 2-methyl resorcinol, 4-chlororesorcinol, 2-amino-4-chlorophenol, 1,3-diaminobenzene, 1,6-dihydroxynaphthaline, 1,7-dihydroxynaphthaline, 2-aminophenol and/or 3-aminophenol. In some embodiments, instead of supplying a coupling substance from the second injector into die 118, the coupling substance may be fed through first injector 116 together with the nanoparticles depending upon chemical properties of the raw materials, nanoparticles or solution in which the nanoparticles are suspended or dissolved.

Figure 5:
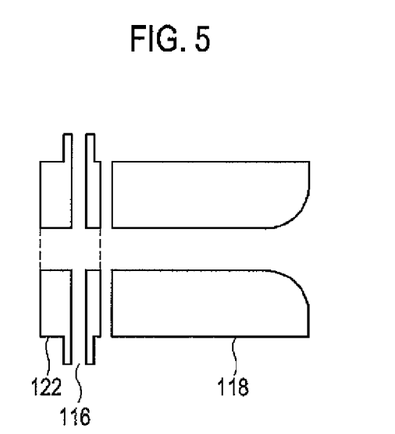
FIG. 5 shows a schematic view of a die and a rotor where a first injector is incorporated in the rotor in another embodiment.

As shown in FIG. 5, first injector 116 may be incorporated in rotor 122. First injectors 116 are configured to be generally flush with the lumen of die 118 to ensure nanoparticles supplied through first injector 116 to flow near the wall of die 118, thereby allowing the nanoparticles to become distributed proximate to an inner wall of die 118. In this way, rotor 122 may exert a frictional force onto the nanoparticles to physically align them. In should be understood that although FIG. 5 illustrates one example of first injector 116 disposed in the rotor 122, first injector 116 may be disposed in various positions in die 118 or rotor 122.

In some embodiments, die 118 includes a third injector (not shown) to supply an additional substance, e.g., a die-releasing agent, into die 118 to facilitate the nanoparticles to be released from the inner wall of die 118 or rotor 122. The third injector may be disposed at a position in die 118 that allow the die-releasing agent to facilitate the molten nano-composite to be easily separated from die 118 and rotor 122. For example, one or more third injectors may be disposed between opening 120 and first injector 116. In some embodiments, the nanoparticles supplied from first injector 116 may be coated or deposited on the surface of molten raw materials flowing through die 118, and the die-releasing agent fed through the third injector may be further deposited onto the nanoparticles. In this way, a layer of the die-leasing agent is deposited on the nanoparticles so that the die-leasing agent may prevent the nanoparticles from being affected by the viscous interaction and from being segregated from the molten raw materials as they are exited from die 118 and rotor 122. In some embodiments, the die-releasing agent may be selected according to detailed chemical or physicochemical features of the nanoparticles and the molten raw materials. For example, the die-releasing agent may include various substances (e.g., colloidal carbon) to physically release the nanoparticles from the inner wall of die 118 by its intervening disposition between the nanoparticles and the inner wall of die 118 and to chemically release the nanoparticles due to its low viscosity, and the like.

The aforementioned polymer extruder 100 may produce various polymeric nano-composites of which surfaces are coated or deposited with helically-aligned, elongated nanoparticles which are in turn aligned with longitudinal axes of the polymeric articles. In some embodiments, the polymeric articles may be made of any thermoplastic polymers or of any mixtures materials which include at least a minimal amount of thermoplastic polymers for fabrication, e.g., through polymeric extrusion. The thermoplastic polymers may include, without limitation, polypropylene homopolymers, polypropylene copolymers, blends thereof, and the like. For example, the homopolymer includes atactic polypropylene, isotactic polypropylene, syndiotactic polypropylene, blends thereof, and the like. The copolymer can be a random copolymer, a statistical copolymer, a block copolymer, blends thereof, and the like. The nanoparticles may be any elongated materials or molecular aggregates having aspect ratios are, e.g., greater than 10, 50, 100, 500 or the like. The nanoparticles may include, but not limited to, carbon nano-tubes, carbon nano wires, and the like. Depending on usage or application, the nano-composites may be generally insulative or only marginally conductive. Similarly, the nano-composites may be typically non-polar or only marginally polar. In alternative embodiments, when desired, the polymeric nano-composites may be processed to be conductive (or polar) or loaded with a conductive (or polar) additive.

Figure 6:
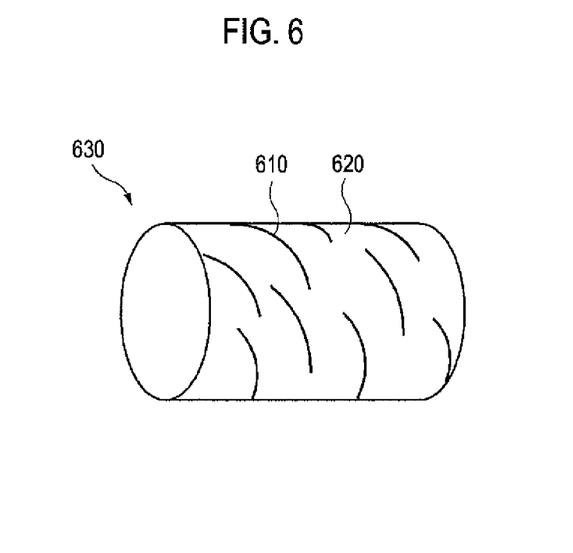
FIG. 6 shows a perspective view of a circular cross-sectioned nano composite rod on which elongated nanoparticles are helically aligned and wound around a longitudinal axis of the rod in one embodiment.

Referring to FIGS. 6 to 11, illustrative embodiments of polymeric articles 630, 730, 840, 930, 1040, 1140 are illustrated. The elongated nanoparticles are coated and helically aligned on the surface of the raw materials to form an article having one of the various shapes such as a rod, a slab and the like and cross-sections including but not limited to a rectangle, a square, a circle, an ellipse, a ring and the like. FIG. 6 shows one embodiment of a circular cross-sectioned nano-composite rod on which elongated nanoparticles are helically aligned and wound around a longitudinal axis of the rod. Article 630 has a circular cross-section and includes helically-aligned nanomaterials 610 that are deposited, adsorbed, or coated on surface 620 of article 630.

Figure 7:
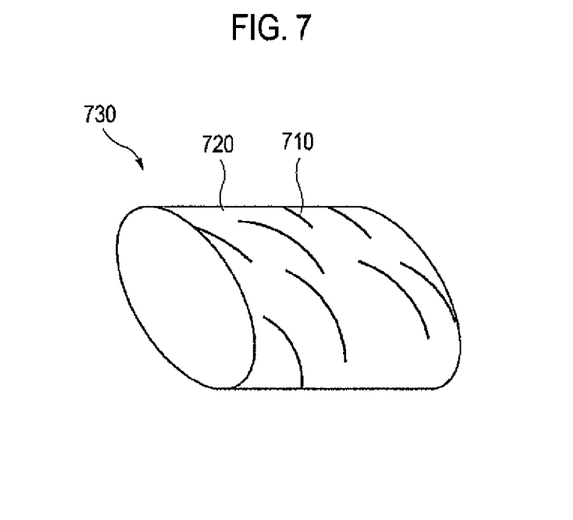
FIG. 7 shows a perspective view of an oval cross-sectioned nano composite rod on which elongated nanoparticles are helically aligned and wound around a longitudinal axis of the rod in one embodiment.
Figure 8:
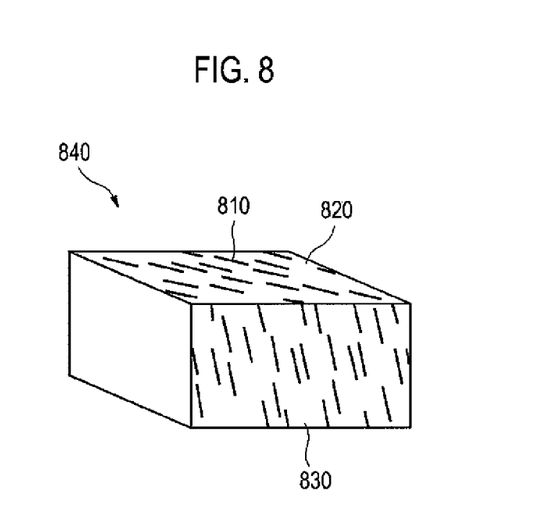
FIG. 8 shows a perspective view of a square cross-sectioned nano composite slab on which elongated nanoparticles are helically aligned and wound around a longitudinal axis of the slab in one embodiment.
Figure 9:
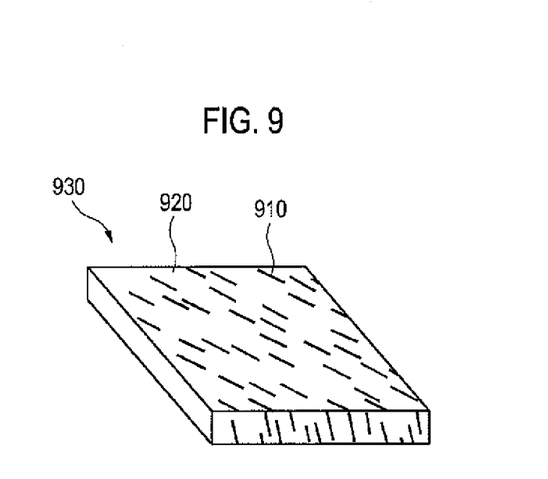
FIG. 9 shows a perspective view of a rectangular cross-sectioned nano composite slab on which elongated nanoparticles are helically aligned and wound around a longitudinal axis of the slab in one embodiment.

FIG. 7 shows one embodiment of an oval cross-sectioned nano-composite rod on which elongated nanoparticles are helically aligned and wound around a longitudinal axis of the rod. Article 730 has an oval cross-section and includes helically-aligned nanomaterials 710 that are deposited, adsorbed, or coated on surface 720 of article 730. FIG. 8 shows one embodiment of a square cross-sectioned nano-composite slab on which elongated nanoparticles are helically aligned and wound around a longitudinal axis of the slab. Article 840 includes helically-aligned nanomaterials 810 that are deposited, adsorbed, or coated on surfaces 820, 830 of the article 840. Article 840 has a square rectangular cross-section. Nanoparticles 810 may be coated in a helical pattern at a non-zero acute angle with respect to a longitudinal axis or length of the slab. FIG. 9 shows one embodiment of a rectangular cross-sectioned nano-composite slab on which elongated nanoparticles are aligned around a longitudinal axis of the slab in one embodiment. Article 930 includes elongated nanomaterials 910 that are deposited, adsorbed, or coated on surfaces 920 of article 930. Article 930 has a cross-section of a rectangle of an aspect ratio, e.g., less than 0.5. Nanoparticles 910 may be coated in a helical pattern at a non-zero acute angle with respect to a longitudinal axis or length of the slab.

Figure 10:
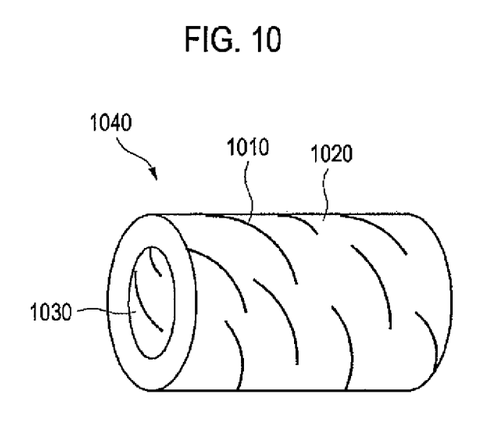
FIG. 10 shows a perspective view of an annular nano composite rod defining inner and outer surfaces both of which are coated with elongated nanoparticles helically aligned and wound around a longitudinal axis of the rod in one embodiment.
Figure 11:
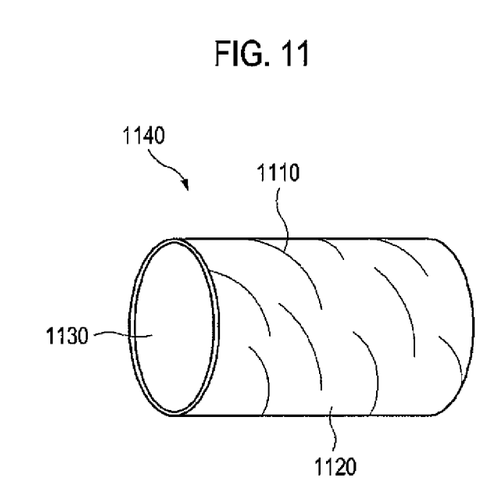
FIG. 11 shows a perspective view of a rod of FIG. 6 which includes an additional coating layer in one embodiment.

FIG. 10 shows one embodiment of an annular nano-composite rod defining inner and outer surfaces both of which are coated with elongated nanoparticles helically aligned around a longitudinal axis of the rod. Article 1040 includes helically-aligned nanomaterials 1010 that are deposited, adsorbed, or coated on an inner surface 1030 and an outer surface 1020 of the article 1040. Article 1040 has the shape of a hollow or annular rod. FIG. 11 shows the nano-composite rod of FIG. 6 which includes an additional coating layer in one embodiment. Article 1140 includes elongated and helically-aligned nanomaterial 1110 that are deposited, adsorbed, or coated on an inner surface 1130 of article 1140 to form an outer surface 1120. As illustrated in FIG. 11, the cylindrical rod of FIG. 1 may include a coating layer which may serve to facilitate adhesion of nanoparticles onto the surface of article 1140, to mechanically protect the nanoparticles from wear and tear, to electrically insulate the nanoparticles, thereby providing a uniform electrical continuity, and the like.

Figure 12:
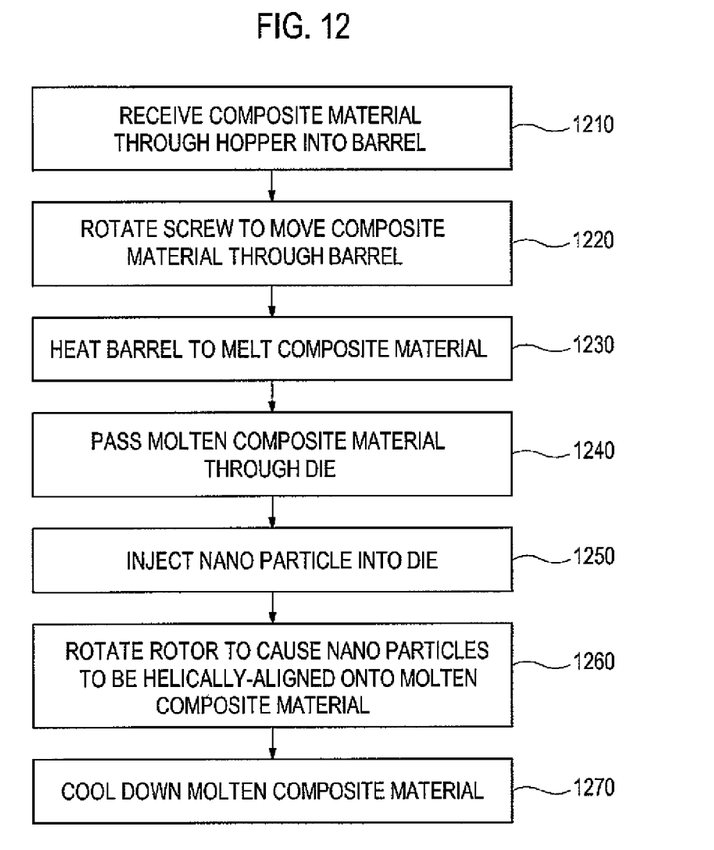
FIG. 12 is a flow chart illustrating a method for manufacturing a nano composite on which nanoparticles are helically aligned in accordance with one embodiment.

Referring to FIG. 12, one embodiment of a method for manufacturing an article on which nanoparticles are helically aligned is illustrated. At block 1210, hopper 110 of polymer extruder 100 receives raw materials, thereby supplying the raw materials from top mounted hopper 110 into barrel 108. The thermoplastic polymers may include, without limitation, polypropylene homopolymer, polypropylene copolymers, blends thereof, and the like. For example, the homopolymer includes atactic polypropylene, isotactic polypropylene, syndiotactic polypropylene, blends thereof, and the like. The copolymer can be a random copolymer, a statistical copolymer, a block copolymer, blends thereof, and the like. In some embodiments, additives such as colorants and UV inhibitors (e.g., in either liquid or pellet form) may be mixed into the raw materials. In this way, the raw materials that pass through hopper 110 into barrel 108 come into contact with screw blade 112 and shaft 114 at the proximal zone of barrel 108.

At block 1220, motor 106 rotates shaft 114 at a predetermined rotation speed to force raw materials to move toward the distal zone of barrel 108. For example, motor 106 may apply a predetermined torque to rotate shaft 114 at up to, e.g., 100 to 200 rpm. In this way, the raw material in barrel 108 may move toward die 118 that is coupled to barrel 108 via feed pipe 104. At block 1230, the beater may heat the barrel 108 to an elevated temperature to melt the raw materials in barrel 108. For example, the heater may heat the barrel 108 to the melting temperature of the raw materials in barrel 108, e.g., to an elevated temperature of about 200° C. or higher. In some embodiments, polymer extruder 100 may include one or more heating elements to provide a heating profile along barrel 108. For example, polymer extruder 100 may have multiple independently-controlled heating elements that gradually increase the temperature of the barrel 108 from the proximal zone of the barrel 108 to the distal zone of the barrel 108, thereby allowing the raw materials to melt gradually as they proceed through barrel 108. At block 1240, the molten raw materials exit from barrel 108 to enter die 118. In some embodiments, the polymer extruder 100 may include screen pack 124 through which the molten raw materials pass to remove any contaminants in the molten raw materials. Screen pack 124 may be disposed between barrel 108 and feed pipe 104.

At block 1250, the nanoparticles are injected through a single or multiple first injectors 116 which provide injection paths for the nanoparticles. The first injectors 116 may be disposed in a proximal zone of die 118. The nanoparticles are injected into the stream of the molten raw materials, thereby forming a layer of nanoparticles on the surface of the molten raw materials. First injectors 116 are generally flush with the lumen of die 118 to allow the nanoparticles to become distributed proximate to an inner wall of die 118, thereby ensuring the nanoparticles to flow near the wall of die 118.

At block 1260, rotor 122 rotates the molten nano-composite to allow the nanoparticles to helically-aligned onto the surface of the raw materials. That is, when the molten raw materials exit from die 118, rotor 122 receives the molten raw materials while generating a rotating movement around the molten raw material as well as physically abutting or contacting the surface of the molten raw materials. In this way, rotor 122 may exert a frictional force onto the nanoparticles to physically align them. Because the molten raw materials are pushed forward while being abutted by revolving rotor 122, the nanoparticles are aligned in a spiral or helical direction around the surface of the molten raw material, as illustrated in FIG. 3. That is, such configuration of first injector 116 and rotor 122, as illustrated in FIG. 3, may exploit so-called "friction-mediated alignment" of the nanoparticles on the surface of the molten raw material while minimizing loss of nanoparticles entrapped in an interior of the molten raw materials.

At block 1270, a cooling device cools off the molten raw materials coated with nanoparticles when the molten nano-composite exits from rotor 122. When the nano-composite material escapes rotor 122 through opening 120, the molten nano-composite may be cooled, e.g., by pulling extruder 100 through a water bath or leaving extruder 100 in room temperature for a predetermined period of time.

In light of the present disclosure, those skilled in the art will appreciate that the systems, apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method comprising:
   receiving raw materials into a barrel;
   heating the barrel to melt the raw materials into molten raw materials;
   displacing the molten raw materials through the barrel to a die fluidly coupled to the barrel;
   injecting nanoparticles into the die to form a layer of the nanoparticles on an external surface of the molten raw materials flowing through the die;
   displacing the molten raw materials having the layer of the nanoparticles through a lumen of a rotor fluidly coupled to the die, wherein the lumen is rotatably coupled to the die;
   rotating the lumen relative to the die to cause the nanoparticles to be helically aligned on the surface of the molten raw materials; and
   cooling the molten raw materials covered by the helically-aligned nanoparticles on the external surface.

2. The method of claim 1, wherein rotating the lumen includes exerting a frictional force on the nanoparticles to make a helical pattern of the nanoparticles around the molten raw materials.

3. The method of claim 2, wherein the helical pattern of the nanoparticles correlates with a revolving speed and an extrusion speed of the raw materials.

4. The method of claim 1, wherein the raw materials comprise colorants and UV inhibitors.

5. The method of claim 1, wherein heating the barrel includes heating the barrel to an elevated temperature greater than 200° C.

6. The method of claim 1, wherein heating the barrel includes heating the barrel to gradually increase the temperature of the barrel from a proximal zone of the barrel to a distal zone of the barrel.

7. The method of claim 1, wherein displacing the molten raw materials through the barrel comprises rotating a screw disposed in the barrel at a rotation speed greater than 100 rpm.

8. The method of claim 1, further comprising filtering the molten raw materials to remove contaminants in the molten raw materials.

9. The method of claim 1, further comprising injecting an additional substance to facilitate coupling of the nanoparticles to the surface of the molten raw materials.

10. The method of claim 9, wherein the additional substance is selected according to chemical or physiochemical features of the nanoparticles and the molten raw materials.

11. The method of claim 1, wherein the raw materials comprise thermoplastic polymers.

12. The method of claim 1, further comprising injecting a die-releasing agent to facilitate releasing the nanoparticles from the inner wall of the die.

13. The method of claim 1, wherein the lumen is rotated at a predetermined revolving speed.

14. The method of claim 1, wherein the raw materials comprise thermoplastic polymers, thermosetting polymers, carbon composites, graphite/epoxy composites or steel-reinforced composites.

15. The method of claim 1, wherein the nanoparticles are elongated particles having an aspect ratio of about 10 or more.

16. The method of claim 1, wherein the nanoparticles comprise carbon nanotubes or carbon nanowires.

17. The method of claim 1, wherein the nanoparticles have an insulative property.

18. The method of claim 1, wherein the nanoparticles are non-polar.

19. The method of claim 1, wherein a linear speed of the molten raw materials in the lumen is less than a revolving speed of the lumen.

20. The method of claim 1, wherein a linear speed of the molten raw materials in the lumen is greater than a revolving speed of the lumen.

21. The method of claim 1, wherein the raw materials comprise polypropylene or a copolymer thereof.

22. A method of manufacturing a nanocomposite comprising:
   displacing fluidic raw materials through a first lumen;
   applying nanoparticles to the external surface of the fluidic raw materials to form fluidic nanocomposite materials, wherein the nanoparticles are applied while the fluidic raw materials displace through the first lumen;

displacing the fluidic nanocomposite materials through a second lumen of a rotor fluidly coupled to the first lumen, wherein the second lumen is rotatably coupled to the first lumen; and rotating the second lumen relative to the first lumen about an axis extending in a direction of displacement of the fluidic nanocomposite materials in the second lumen, wherein the second lumen is rotated while the fluidic nanocomposite materials displace through the second lumen.

23. The method of claim 22, further comprising cooling the fluidic nanocomposite materials to obtain rigid nanocomposite materials comprising nanoparticles on the external surface thereof.

24. The method of claim 22, wherein rotating the second lumen exerts a frictional force on the nanoparticles to make a helical pattern of the nanoparticles around the raw materials.

25. The method of claim 24, wherein the helical pattern of the nanoparticles correlates with a revolving speed of the second lumen and a linear speed of the fluidic nanocomposite materials.

26. The method of claim 22, wherein the fluidic raw materials comprise colorants and UV inhibitors.

27. The method of claim 22, wherein the fluidic raw materials have a temperature of at least about 200° C. when entering the first lumen.

28. The method of claim 22, further comprising filtering the fluidic raw materials to remove contaminants.

29. The method of claim 22, further comprising applying an additional substance to the fluidic raw materials while displacing through the first lumen, wherein the additional substance is configured to facilitate coupling of the nanoparticles to the surface of the fluidic raw materials.

30. The method of claim 22, wherein the fluidic raw materials comprises one or more thermoplastic polymers.

31. The method of claim 22, further comprising applying a die-releasing agent to the fluidic raw materials, wherein the die-releasing agent is configured to facilitate releasing of the nanoparticles from an inner wall of the first lumen.

32. The method of claim 22, wherein the nanoparticles are elongated particles having an aspect ratio of about 10 or more.

33. The method of claim 22, wherein the fluidic raw materials comprise polypropylene or a copolymer thereof.

34. The method of claim 22, wherein the second lumen is rotated at a predetermined revolving speed.

35. The method of claim 22, wherein a linear speed of the fluidic raw materials in the second lumen is greater than a revolving speed of the second lumen.

36. A method of manufacturing a nanocomposite comprising:

receiving raw materials into a barrel;

heating the barrel to melt the raw materials into molten raw materials;

displacing the molten raw materials through the barrel to a first lumen of a die fluidly coupled to the barrel;

displacing the molten raw materials though the first lumen of the die to a second lumen of a rotor fluidly coupled to the first lumen of the die, wherein the second lumen is rotatably coupled to the die;

injecting nanoparticles into the second lumen to form a layer of the nanoparticles on an external surface of the molten raw materials;

displacing the molten raw materials having the layer of nanoparticles through at least a portion of the second lumen while rotating the second lumen relative to the die to cause the nanoparticles to be helically aligned on the surface of the molten raw materials; and cooling the molten raw materials covered by the helically aligned nanoparticles on the external surface.

* * * * *